United States Patent
Van Bebber et al.

(10) Patent No.: US 10,369,919 B2
(45) Date of Patent: Aug. 6, 2019

(54) VEHICLE WITH AN INTEGRATED ELECTRIC MOTORCYCLE

(71) Applicant: FORD GLOBAL TECHNOLOGIES, LLC, Dearborn, MI (US)

(72) Inventors: David Van Bebber, Aachen (DE); Hans Guenter Quix, Herzogenrath (DE); Andreas Schmitt, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 107 days.

(21) Appl. No.: 15/787,206

(22) Filed: Oct. 18, 2017

(65) Prior Publication Data
US 2018/0111540 A1    Apr. 26, 2018

(30) Foreign Application Priority Data
Oct. 21, 2016  (DE) .......................... 10 2016 220 673

(51) Int. Cl.
*B62D 47/00*    (2006.01)
*B62H 3/00*    (2006.01)
(Continued)

(52) U.S. Cl.
CPC .................. *B60P 3/07* (2013.01); *B60K 6/52* (2013.01); *B60N 2/005* (2013.01); *B60N 2/5678* (2013.01); *B60R 16/037* (2013.01); *B62D 25/08* (2013.01); *B62D 47/006* (2013.01); *B62D 63/025* (2013.01); *B62H 3/00* (2013.01); *B62K 13/00* (2013.01); *B60K 1/04* (2013.01); *B60K 7/0007* (2013.01); *B60L 2200/12* (2013.01);
(Continued)

(58) Field of Classification Search
CPC ........ B62H 3/00; B62K 13/00; B62D 63/025; B62D 25/08; B62D 47/006; B60K 1/04; B60K 6/52; B60K 7/0007; B60R 16/037; B60P 3/07; B60N 2/5678; B60N 2/005; B60L 2200/12; B60L 2220/44; B60Y 2200/11; B60Y 2200/12; Y10S 903/916
USPC ..................................... 180/14.1; 280/33.991
See application file for complete search history.

(56) References Cited

U.S. PATENT DOCUMENTS

| | | | |
|---|---|---|---|
| 5,649,803 A * | 7/1997 | Bennett | B60P 1/43 414/537 |
| 6,540,569 B1 | 4/2003 | Gong | |

(Continued)

FOREIGN PATENT DOCUMENTS

WO    2006095211 A1    9/2006

*Primary Examiner* — Kevin Hurley
*Assistant Examiner* — Daniel S Yeagley
(74) *Attorney, Agent, or Firm* — Gregory P. Brown; Brooks Kushman, P.C.

(57) ABSTRACT

The disclosure relates to a multimodal transportation apparatus for passenger transportation. The multimodal transportation apparatus comprises a passenger car. According to the disclosure, the multimodal transportation apparatus contains a motorcycle that is equipped with, and can be driven by an electric motor, and a securing apparatus to releasably fixedly secure the motorcycle to the passenger car. The motorcycle is arranged between a driver seat and a passenger seat, as seen in a direction of travel, in a secured operating state. At least a portion of a center console serves to support at least one body part of a rider of the motorcycle in an operating state, wherein the motorcycle is detached from the passenger car.

20 Claims, 3 Drawing Sheets

(51) Int. Cl.

| | |
|---|---|
| *B60P 3/07* | (2006.01) |
| *B60K 6/52* | (2007.10) |
| *B60N 2/56* | (2006.01) |
| *B60R 16/037* | (2006.01) |
| *B62D 63/02* | (2006.01) |
| *B62K 13/00* | (2006.01) |
| *B62D 25/08* | (2006.01) |
| *B60N 2/005* | (2006.01) |
| *B60K 7/00* | (2006.01) |
| *B60K 1/04* | (2019.01) |

(52) U.S. Cl.
CPC ........ *B60L 2220/44* (2013.01); *B60Y 2200/11* (2013.01); *B60Y 2200/12* (2013.01); *Y10S 903/916* (2013.01)

(56) References Cited

U.S. PATENT DOCUMENTS

| | | | |
|---|---|---|---|
| 7,097,407 B2 * | 8/2006 | Kurohori | B62H 3/00 |
| | | | 296/37.6 |
| 7,329,080 B1 * | 2/2008 | Kumar | B60P 3/07 |
| | | | 414/537 |
| 7,950,977 B2 | 5/2011 | Sun et al. | |
| 8,177,011 B2 * | 5/2012 | Fletcher | B62K 13/04 |
| | | | 180/11 |
| 8,998,050 B1 | 4/2015 | Battle | |
| 2003/0070855 A1 * | 4/2003 | Horii | B60P 3/07 |
| | | | 180/208 |
| 2006/0231581 A1 | 10/2006 | Jones | |
| 2015/0353157 A1 | 12/2015 | Huennekens et al. | |

* cited by examiner

VEHICLE WITH AN INTEGRATED ELECTRIC MOTORCYCLE

CROSS-REFERENCE TO RELATED APPLICATIONS

This application claims foreign priority benefits under 35 U.S.C. § 119(a)-(d) to DE Application 10 2016 220 673.7 filed Oct. 21, 2016, which is hereby incorporated by reference in its entirety.

TECHNICAL FIELD

The disclosure relates to a multimodal transportation apparatus for passenger transportation.

BACKGROUND

Owing to restrictions of available and/or affordable parking spaces in urban areas and of free access to certain, especially inner city, regions by vehicles comprising an internal combustion engine, which restrictions exist owing to environmental regulations for example, drivers of vehicles comprising an internal combustion engine are faced with the problem of reaching a desired location within an inner city region of this kind as quickly as possible. A common solution to this problem could be, for example, to take along a bicycle in the vehicle comprising an internal combustion engine, driving to a parking space outside the inner city region, parking the vehicle comprising an internal combustion engine there and riding to the desired location on the bicycle.

The vehicle and the bicycle, which is taken along, form an example of a multimodal transportation apparatus. In this context, the term "multimodal transportation apparatus" is intended to include, in particular, at least driving a vehicle to a location at which the vehicle can be parked, and then riding/driving away from the vehicle to a final destination using further transportation.

Multimodal transportation apparatuses are known from the prior art. By way of example, published document US 2015/0353157 A1 describes an apparatus for multimodal transportation. A unicycle with its own drive is selectively brought into engagement with the vehicle and selectively disengaged from the vehicle for independent use. The unicycle with its own drive includes a hub and a wheel, which is rotatably connected to the hub. A motor is fitted to the hub, and is connected to the wheel in order to rotate the wheel in relation to the hub. The hub includes an engagement feature for selectively engaging with and disengaging from the vehicle. The apparatus thus comprises a motor vehicle and a unicycle. A wheel in which a motor is arranged is arranged on the motor vehicle. The wheel can be disassembled from the motor vehicle and can be mounted on a frame, which is transported in the trunk of the motor vehicle. Therefore, the unicycle is formed, said unicycle being driven by the wheel which was disassembled from the motor vehicle.

A driver can drive the vehicle to a selected location and park the vehicle at the selected location. The driver can then release the wheel comprising a drive from the motor vehicle and fit said wheel to the frame, and can ride the unicycle to a different destination. In other words, the driver uses the vehicle and the unicycle as a multimodal transportation apparatus. The unicycle can be easily and quickly maneuvered in high-traffic areas. Removing the wheel from the vehicle functions as a theft-prevention feature since the vehicle can no longer be used as a transportation means in this state.

U.S. Pat. No. 7,950,977 B2 discloses a toy that comprises a futuristic motorcycle, which can be played with on its own or in a manner integrated in a carrier vehicle. The carrier vehicle comprises a four-wheeled base with paneling, it being possible for the front part of said paneling to be folded open together with two front wheels so as to create space in order to obtain access to the motorcycle. An ejector mechanism is provided in order to discharge the motorcycle from the carrier vehicle under the action of force with the paneling folded open.

WO 2006/095211A1 discloses a two-in-one vehicle that comprises two autonomous four-wheeled passenger motor vehicles of identical design, which can be combined at the rear to form a vehicle that is twice the size. The vehicle that is twice the size is obtained from the two passenger motor vehicles by the rear wheels of said passenger motor vehicles being folded in and stored in a storage area of the vehicle, which is obtained by connection at the rear. The two autonomous passenger motor vehicles that are half the size require less parking area, and are, therefore, better suited for use in inner city areas than the two-in-one vehicle of twice the size. However, one disadvantage of this, amongst others, is the amount of force that has to be manually applied for combining the two smaller passenger motor vehicles and for disconnecting the two-in-one vehicle.

A further proposal for a two-in-one vehicle (under www.auto.de/magazin/split-and-go-variables-fahrzeug-konzept-zwei-in-einem) provides for extending a small four-wheeled passenger vehicle, such as a Smart car, with an extension part that can be coupled to said small four-wheeled passenger vehicle in a piggyback fashion, and is provided with two wheels at its rear. The extension part cannot be driven autonomously, but it comprises, at the front, a ramp for making it easier to couple and uncouple the extension part.

US 2006/023158A1 discloses, by way of example, releasably attaching a motorcycle to a transporting vehicle, such as a pickup truck, by means of a securing apparatus in a piggyback fashion.

In view of the searched prior art, there is further room for improvement in the field of multimodal transportation apparatuses.

SUMMARY

The disclosure is based on the object of providing a multimodal transportation apparatus for passenger transportation that is as simple as possible to operate and/or allows flexible options in terms of use.

It should be noted that the features and measures specified individually in the following description may be combined with one another in any desired technically meaningful way and disclose further refinements of the disclosure. The description, in particular in conjunction with the figures, characterizes and specifies the disclosure further.

The multimodal transportation apparatus according to the disclosure for passenger transportation comprises a passenger car with a driver's seat, a passenger seat and a center console. The multimodal transportation apparatus further comprises a motorcycle that is equipped with, and can be autonomously driven, by an electric motor, and a securing apparatus that releasably fixedly secures the motorcycle to the passenger car.

In this context, the term "releasably fixedly securing" is intended to be understood to mean, in particular, a mechanical connection between the passenger car and the motorcycle, which connection can be established and released by a user in a reversible manner.

In this case, the motorcycle is arranged between the driver's seat and the passenger seat, as seen in the direction of travel, in a secured operating state and at least a portion of the center console serves to support at least one body part of a rider of the motorcycle in an operating state of the motorcycle in which it is detached from the passenger car.

In this way, the electric motorcycle can be detached from the passenger car by the user as required, as a result of which the electric motorcycle and the passenger car can serve to further transport passengers independently of one another. In this case, the electric motorcycle can be removed in the direction of travel after opening the front hood of the passenger car.

In this case, an upper part of the center console can serve at least as part of a handlebar of the motorcycle. A lower part of the center console can serve as a seat for the rider of the motorcycle.

In an advantageous refinement, the securing apparatus contains at least one guide element that guides a movement of the motorcycle as it is moved between the secured operating state and the detached operating state. As a result, the motorcycle can be moved in a precise manner and with a low degree of wear as it is moved into place, and the motorcycle can be exactly positioned to implement the secured operating state.

The at least one guide element is particularly, preferably in the form of a pair of guide rails that are arranged parallel in relation to one another in the direction of travel of the passenger car, and at a distance from one another perpendicular to the direction of travel.

When the securing apparatus comprises at least one actuator that moves the motorcycle between the secured operating state and the detached operating state, the releasably fixed securing of the motorcycle to the passenger car by the user can advantageously be established and released particularly quickly, and without use of a tool. The at least one actuator can preferably be formed by an electric drive and/or by a hydraulic drive.

In one embodiment of the disclosure, the motorcycle has a rechargeable battery (that is to say an accumulator) that supplies power to the electric motor, said rechargeable battery being connected electrically in parallel with a battery of the passenger car in the secured operating state. As a result, the rechargeable battery of the motorcycle can be charged in the secured operating state by the same charging apparatus that also charges the battery of the passenger car during driving.

The rechargeable battery of the motorcycle is preferably connected electrically in parallel to the battery of the passenger car in an automatic manner as, or after, the motorcycle is moved to the secured operating state.

When the center console contains a car infotainment system, said car infotainment system can be made available to the driver of the motorcycle after the motorcycle is moved to the detached operating state.

In this context, a "car infotainment system" is intended to be understood to mean, in particular, a system that contains at least a car radio and a visual display unit. The car infotainment system can further comprise a hands-free device and/or an on-board computer.

In a further embodiment, the center console can have a satellite-based navigation system that can be used by the driver of the passenger car in the secured operating state of the motorcycle, and by the rider of the motorcycle in the detached operating state of the motorcycle. The satellite-based navigation system can preferably be designed as a GPS ("Global Positioning System")-based navigation system.

A particularly convenient and economical solution for a multimodal transportation apparatus can be provided by use of the car infotainment system, and the satellite-based navigation system, both in the passenger car in the secured operating state of the motorcycle and also when riding the motorcycle in the detached operating state.

When the center console has at least one electrically heatable heating element, seat heating can be provided for the rider of the motorcycle with a suitable design in the detached operating state.

In one embodiment of the multimodal transportation apparatus according to the disclosure, the passenger car is equipped with electric wheel hub motors at least on the front axle. Owing to the omission of a motor that is arranged beneath a front hood in the engine compartment, a sufficient amount of installation space can be provided that accommodates the motorcycle in the secured state. If the passenger car is designed with wheel hub motors or other drive assemblies, it is expedient when, in the secured operating state, the wheels of the motorcycle are at a distance, without contact, from a surface on which the wheels of the passenger car are standing. To this end, it is merely necessary for the securing apparatus to be arranged at a corresponding height. If the passenger car is driven by the motorcycle (this will be discussed in greater detail further below), at least the driven wheel of the motorcycle is in contact with the roadway surface even in the secured operating state.

Furthermore, it can also be provided to equip the passenger car with electric wheel hub motors both on the front axle and on the rear axle.

A sufficient amount of installation space to accommodate the motorcycle in the secured state can also be achieved when the passenger car is equipped with a rear drive that contains a rear-side internal combustion engine. In this case, the rear drive can be provided as an alternative, or in addition to, the electric wheel hub motors on the front axle.

When the multimodal transportation apparatus is equipped with a rear drive in addition to the electric wheel hub motors on the front axle, the rear-side internal combustion engine can be used as part of a range extender for the electric wheel hub motors.

In one embodiment of the multimodal transportation apparatus according to the disclosure, the electric motor of the motorcycle serves to drive the multimodal transportation apparatus by itself in at least one operating state. As a result, a particularly flexible option of using the multimodal transportation apparatus as a hybrid vehicle (internal combustion engine plus electric drive) can be made possible. Use of electric wheel hub motors is not required to this end.

Further advantageous refinements of the disclosure are disclosed in the following description of the figures, in which:

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In the various figures, identical parts are always provided with the same reference symbols, and therefore said parts are generally also described only once.

Figure 1:
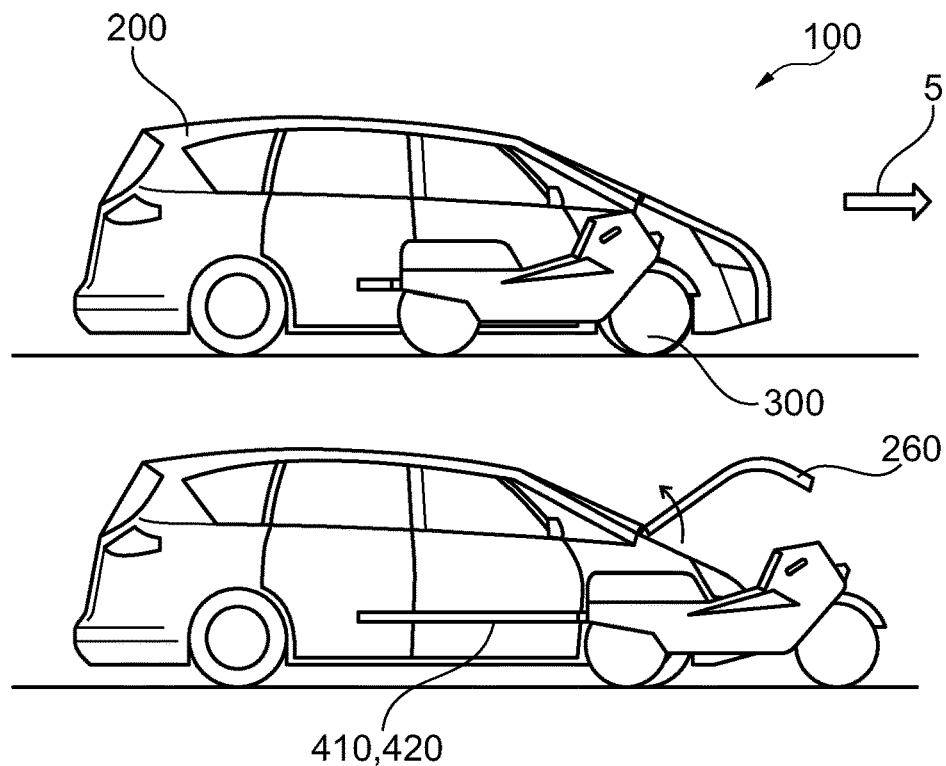
FIG. 1 shows a schematic side view of one embodiment according to the disclosure of a multimodal transportation apparatus for passenger transportation.

FIG. 1 shows a side view of a possible embodiment according to the disclosure of a multimodal transportation apparatus 100 for passenger transportation. The multimodal transportation apparatus 100 comprises a passenger car 200 and a motorcycle 300, which is equipped with and can be driven by an electric motor. The passenger car 200 further has a driver's seat 210, a passenger seat 220 and a center console 230. An upper part 231 of said center console 230 is integrated in a dashboard as shown in a schematic view, illustrated in FIG. 2, of a passenger compartment of the multimodal transportation apparatus 100.

A securing apparatus 400 of the multimodal transportation apparatus 100 serves to releasably, fixedly secure the motorcycle 300 to the passenger car 200. The securing apparatus 400 contains two guide elements 410, 420 that form guide rails, and are arranged horizontally and parallel in relation to one another in a direction 5 of travel of the passenger car 200, and at a distance from one another perpendicular to the direction 5 of travel (FIGS. 1 and 4).

Figure 2:
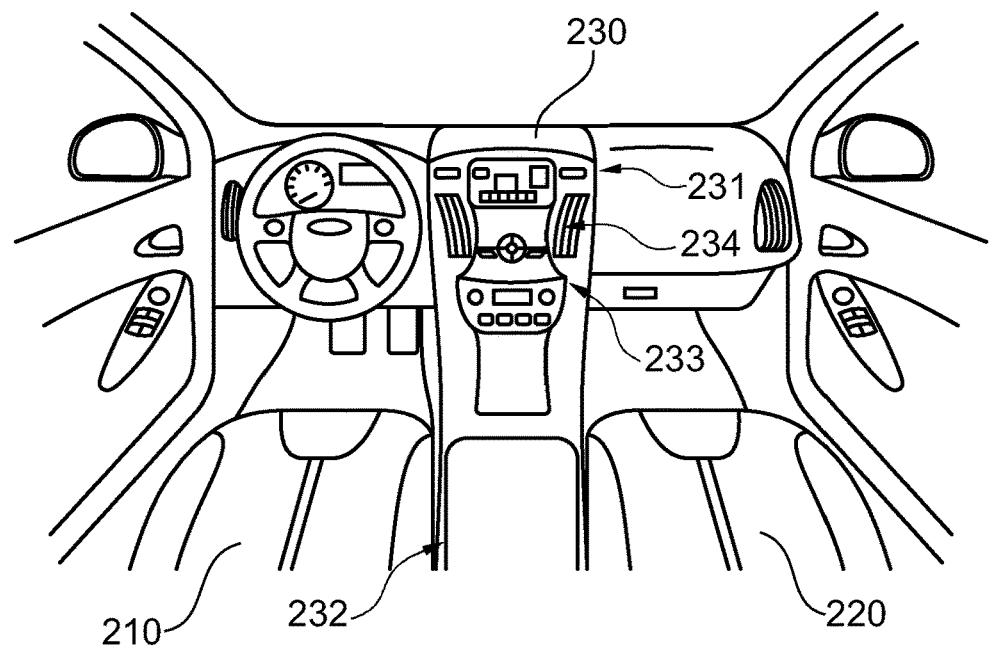
FIG. 2 shows a schematic view of the passenger compartment of the multimodal transportation apparatus according to FIG. 1.
Figure 3:
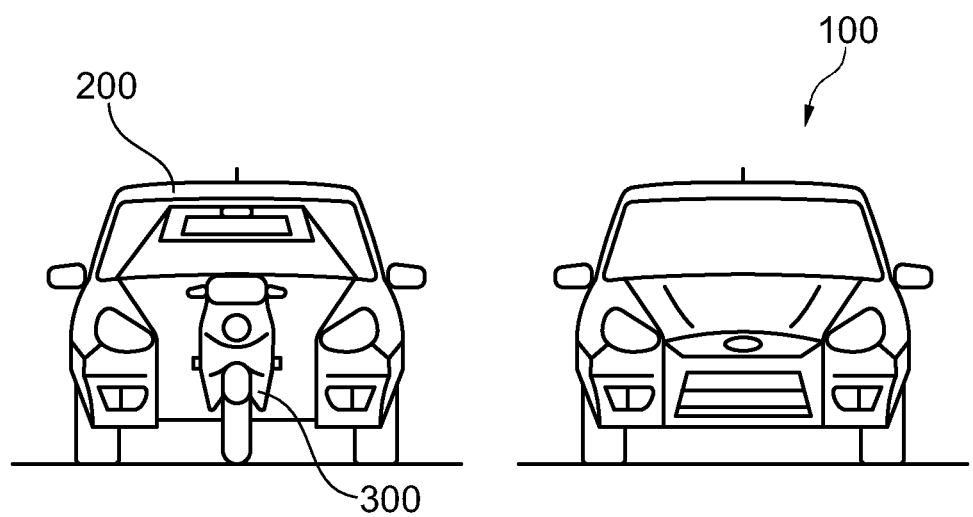
FIG. 3 shows a schematic front view of the multimodal transportation apparatus according to FIG. 1.

As is clear from FIG. 2 and from the schematic front view, illustrated in FIG. 3, of the multimodal transportation apparatus 100, the motorcycle 300 is arranged between a driver's seat 210 and a passenger seat 220, as seen in the direction 5 of travel, in a secured operating state. This operating state is also illustrated in the upper part of FIG. 1.

The guide elements 410, 420 of the securing apparatus 400 are provided to guide a movement of the motorcycle 300 as it is moved between the secured operating state and a detached operating state of the motorcycle 300. The detached operating state of the motorcycle 300 is shown in the lower part of FIG. 1. The upper part of FIG. 1 shows that, in the secured operating state, wheels of the motorcycle 300 are at a distance, without contact, from a surface on which wheels of the passenger car 200 are standing.

Figure 4:
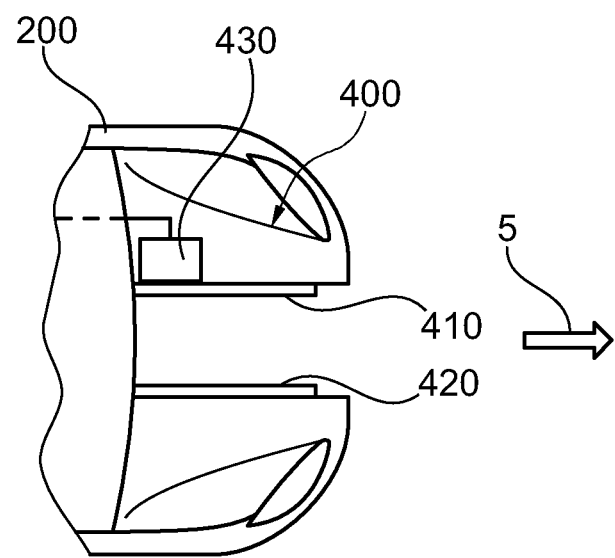
FIG. 4 shows a schematic plan view of a front part of the multimodal transportation apparatus according to FIG. 1 with the front hood open or omitted.

The guide elements 410, 420 are clearly shown in the schematic plan view shown in FIG. 4 of a front part of the passenger car 200 with the front hood 260 open or omitted. The securing apparatus 400 contains an actuator 430, which is in the form of an electric drive, to move the motorcycle 300 between the secured operating state and the detached operating state. In another embodiment, the actuator can also be in the form of a hydraulic drive. For safety reasons, the actuator 430 can be activated by a user only when the engine is switched off and the ignition is switched on. The motorcycle 300 can be removed in a simple manner in the direction 5 of travel after the front hood 260 (FIG. 1) of the passenger car 200 is opened since the parts of the passenger car 200 that are arranged close to the motorcycle 300 form an open fork shape. The parts of the passenger car 200 that are arranged beneath a front hood 260 are protected by flat covers.

In the secured operating state of the motorcycle 300, an air gap between a portion of the center console 230 that forms part of the passenger car 200 and another portion of the center console 230 that forms part of the motorcycle 300 is sealed off (not illustrated) by means of a rubber seal, similarly to the sealing of a vehicle door.

Hydraulic securing may optionally be used to ensure the secured operating state of the motorcycle 300, it being possible, for example, for said hydraulic securing to be hydraulically movable securing bolts that are fitted to the passenger car 200, and engage in corresponding recesses in the motorcycle 300. When the actuator 430 is activated by the user, the hydraulic securing releases the motorcycle 300 before it is moved to the detached operating state.

As is clear by comparing FIG. 1 and FIG. 2, the upper portion 231 of the center console 230 serves as part of a handlebar of the motorcycle 300 to support arms of a rider of the motorcycle 300, in an operating state of the motorcycle 300 being detached from the passenger car 200. A lower portion 232 of the center console 230 serves as a seat for the rider to support lower body parts of the rider of the motorcycle 300. Furthermore, an electrically heatable heating element is arranged (not illustrated) in the lower portion 232 of the center console 230 such that the lower portion 232 of the center console 230 is heated in the detached operating state of the motorcycle 300 by said electrically heatable heating element.

The center console 230 has a car infotainment system 233, which comprises a car radio, a visual display unit being a touch-sensitive screen, a hands-free radio device that is equipped with Bluetooth, and an on-board computer, and can be used by the rider of the motorcycle 300 in the detached operating state. The center console 230 also has a GPS-based, satellite-based navigation system 234, which can be used by the driver of the passenger car 200 in the secured operating state of the motorcycle 300, and by the rider of the motorcycle 300 in the detached operating state of the motorcycle 300.

Figure 5:
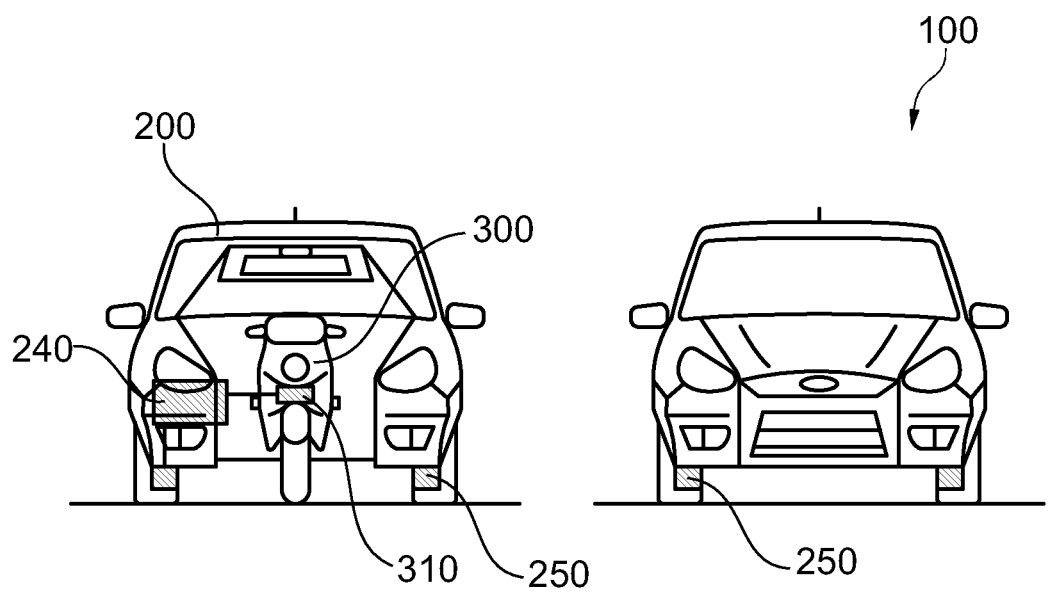
FIG. 5 shows a further schematic front view of the multimodal transportation apparatus according to FIG. 1.

FIG. 5 shows a further schematic front view of the multimodal transportation apparatus 100 in a secured operating state of the motorcycle 300. The motorcycle 300 has a rechargeable battery 310 that supplies power to the electric motor. As shown in FIG. 5, the rechargeable battery 310 of the motorcycle 300 is connected electrically in parallel with a battery 240 of the passenger car 200 in the secured operating state. In the secured operating state, the rechargeable battery 310 of the motorcycle 300 is charged by a charging apparatus for the battery 240 of the passenger car 200, and is, therefore, always in an at least partially charged state in the detached operating state of the motorcycle 300.

Figure 6:
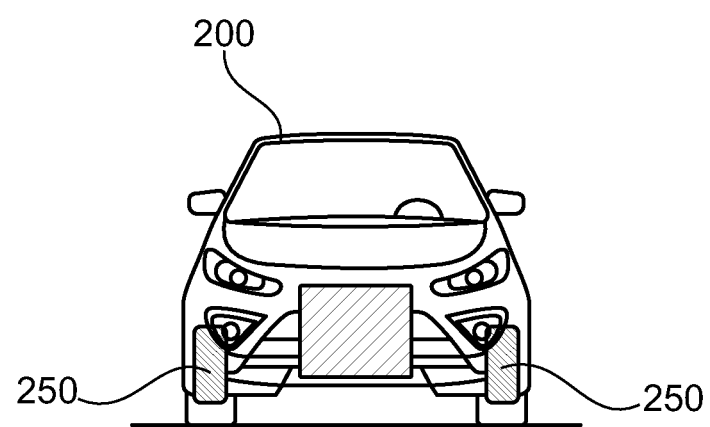
FIG. 6 shows a further schematic front view of the multimodal transportation apparatus according to FIG. 1.

FIG. 5 and a further schematic front view of the multimodal transportation apparatus 100 in FIG. 6 show that the passenger car 200 can be equipped with electric wheel hub motors 250 on the front axle. As an alternative, the passenger car 200 can be equipped with a rear drive that includes a rear-side internal combustion engine (not illustrated). In both cases, there is a sufficient amount of installation space to accommodate the motorcycle 300 in the secured state.

When the passenger car 200 is equipped with a rear drive with a rear-side internal combustion engine, the multimodal transportation apparatus 100, as shown in FIG. 5, further provides the option of, in a further mode, using the electric motor of the motorcycle 300 in the secured operating state to drive the multimodal transportation apparatus 100 by itself. To this end, it is necessary for the drive wheel of the motorcycle 300 to be in contact with the ground, for example by being deliberately lowered for this mode. This is not absolutely necessary for the above-described secured operating state of the motorcycle 300. In this way, the multimodal transportation apparatus 100 can be operated as a hybrid vehicle having an internal combustion engine and an electric drive.

If the passenger car 200 and the motorcycle 300 of the multimodal transportation apparatus 100 are disconnected from one another, they can both be operated autonomously from one another. In other words, both vehicles can continue to be driven separately after they have been disconnected, even if the center console 230 is arranged on the motorcycle 300.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A multimodal passenger transportation apparatus comprising
   a passenger car with a drivers seat, a passenger seat and a center console;
   a motorcycle equipped with and autonomously driven by an electric motor; and
   a securing apparatus that releasably, fixedly secures the motorcycle to the passenger car, wherein the motorcycle is arranged between the driver seat and the passenger seat in a direction of travel, in a secured state, and at least a portion of the center console supports at least one body part of a motorcycle rider in an operating state of the motorcycle being detached from the passenger car.

2. The multimodal passenger transportation apparatus as claimed in claim 1 further comprising at least one guide element coupled with the securing apparatus that guides a movement of the motorcycle during movement between the secured state and the operating state.

3. The multimodal passenger transportation apparatus as claimed in claim 1 further comprising at least one actuator, coupled with the securing apparatus, that moves the motorcycle between the secured state and the operating state.

4. The multimodal passenger transportation apparatus as claimed in claim 1 further comprising a rechargeable battery that supplies power to the electric motor, and is connected electrically in parallel with a passenger car battery in the secured state.

5. The multimodal passenger transportation apparatus as claimed in claim 1 further comprising a car infotainment system disposed within the center console.

6. The multimodal passenger transportation apparatus as claimed in claim 1 further comprising a satellite-based navigation device disposed within the center console.

7. The multimodal passenger transportation apparatus as claimed in claim 1 further comprising at least one electrically heatable heating element disposed within the center console.

8. The multimodal passenger transportation apparatus as claimed in claim 1 further comprising electric wheel hub motors disposed at least on a front axle of the passenger car.

9. The multimodal passenger transportation apparatus as claimed in claim 1 further comprising a rear drive that contains a rear-side internal combustion engine.

10. The multimodal passenger transportation apparatus as claimed in claim 1, wherein the electric motor is configured to drive the passenger car and the motorcycle in at least a further operating state.

11. A vehicle comprising:
    a console disposed between driver and passenger seats, and including a portion that supports a motorcycle rider in an operating state that detaches a motorcycle from the vehicle; and
    a securing apparatus that releasably, fixedly secures the motorcycle between the seats in a travel direction in a secured state, and includes an actuator that moves the motorcycle between the states using a guide element during movement between the states.

12. The vehicle as claimed in claim 11 further comprising a rechargeable battery that supplies power to the motorcycle, and is connected electrically in parallel with a vehicle battery in the secured state.

13. The vehicle as claimed in claim 11 further comprising a car infotainment system disposed within the console, and coupled with the motorcycle.

14. The vehicle as claimed in claim 11 further comprising a satellite-based navigation device disposed within the console, and coupled with the motorcycle.

15. The vehicle as claimed in claim 11 further comprising at least one electrically heatable heating element disposed within the console, and coupled with the motorcycle.

16. The vehicle as claimed in claim 11 further comprising an electric motor that drives the vehicle and the motorcycle in at least a further operating state.

17. A multimodal transportation system comprising:
    a center console disposed between driver and passenger seats of a passenger car, and including an on-board computer that detaches the motorcycle from the passenger car in an operating state; and
    a securing apparatus that releasably, fixedly secures a motorcycle between the seats in a direction of travel in a secured state, and includes an actuator coupled with the on-board computer to move the motorcycle between the states using a guide element to guide a movement of the motorcycle during movement between the states.

18. The securing apparatus as claimed in claim 17 further comprising a rechargeable battery that supplies power to the motorcycle, and is connected electrically in parallel with a passenger car battery in the secured state.

19. The securing apparatus as claimed in claim 17 further comprising a satellite-based navigation device disposed within the center console, and coupled with the motorcycle.

20. The securing apparatus as claimed in claim 17 further comprising an electric motor that drives a vehicle and the motorcycle in at least a further operating state.

* * * * *